(12) United States Patent
Stratton et al.

(10) Patent No.: US 7,776,954 B2
(45) Date of Patent: Aug. 17, 2010

(54) PHOTOCATALYTIC COATING COMPOSITIONS

(75) Inventors: John Stratton, Cleethorpes (GB); Graham Goodwin, Cleethorpes (GB)

(73) Assignee: Millenium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 12/022,823

(22) Filed: Jan. 30, 2008

(65) Prior Publication Data

US 2009/0192252 A1 Jul. 30, 2009

(51) Int. Cl.
*C08L 83/04* (2006.01)
(52) U.S. Cl. ............... 524/588; 524/847; 524/445; 524/447; 524/788
(58) Field of Classification Search .......... 524/588, 524/847, 445, 447, 788
See application file for complete search history.

(56) References Cited

U.S. PATENT DOCUMENTS

| 6,315,963 | B1 | 11/2001 | Speer | |
| 6,334,894 | B1 * | 1/2002 | Kostuch | 106/486 |
| 2004/0014865 | A1 * | 1/2004 | Keller et al. | 524/442 |
| 2005/0239934 | A1 | 10/2005 | Agra-Gutierrez et al. | |

FOREIGN PATENT DOCUMENTS

WO  WO2006/030250 A2 *  3/2006

OTHER PUBLICATIONS

A PCT Search Report sent on Oct. 22, 2008, PCT/US 08/72120.
U.S. Appl. No. 11/582,763, filed Oct. 18, 2006, Stratton et al.
U.S. Appl. No. 12/116,070, filed May 6, 2008, Stratton et al.
Ke, Yuzhang et al., "Preparation of Titania coating on ceramic surface for anit-fouling, deodorization, and sterilization," 2001, abstract.
Yu et al., J. Chem. Ed., 1998, vol. 75, No. 6, 750-751.
English language translation of the abstract for DE19858933, Jun. 2000.
English language translation of the abstract for FR2838735, Oct. 2003.
English language translation of the abstract for FR2776944, Oct. 1999.

* cited by examiner

*Primary Examiner*—Kuo-Liang Peng
(74) *Attorney, Agent, or Firm*—Dunlap Codding, P.C.

(57) ABSTRACT

De-polluting, self-cleaning coating compositions are disclosed which comprise an extender that comprises a mixture of calcium carbonate and one or more alternate extenders. The coatings of the invention exhibit improved durability and opacity without affecting the photocatalytic removal of $NO_x$ compounds.

1 Claim, 2 Drawing Sheets

PHOTOCATALYTIC COATING COMPOSITIONS

FIELD OF INVENTION

The present invention relates to compositions for imparting a photocatalytic coating on a surface. More specifically, the invention relates to de-polluting, self-cleaning coating compositions comprising photocatalytic titanium dioxide particles and an extender comprising a mixture of calcium carbonate and an alternate extender.

BACKGROUND OF THE INVENTION

Titanium dioxide is a photoactive material that is used widely as a pigment in coatings, paper plastics and ink. For pigment applications, the photoactive properties are not typically desired and the pigmentary grade titanium dioxide is generally prepared by methods that suppress the photoactivity of the material. Titanium dioxide is produced in two crystal phases, rutile and anatase, that differ in lattice structures, refractive indices, and densities. The rutile phase is the more stable phase and is favored for use in pigment applications because rutile pigments have a higher refractive index than their anatase counterparts, resulting in greater opacity and whiteness.

The anatase form of titanium dioxide is usually more photoactive than the rutile form and used for photocatalytic applications, while the rutile form is used as a pigment. The photocatalytic properties of titanium dioxide result from the promotion of electrons from the valence band to the conduction band under the influence of ultraviolet (UV) and near-UV radiation. The reactive electron-hole pairs that are created migrate to the surface of the titanium dioxide particles where the holes oxidize adsorbed water to produce reactive hydroxyl radicals and the electrons reduce adsorbed oxygen to produce superoxide radicals, both of which can degrade $NO_x$ and volatile organic compounds (VOCs) in the air. In view of these properties, photocatalytic titanium dioxide has been employed in coatings and the like to remove pollutants from the air. Such coatings may also have the advantage of being self-cleaning since soil (grease, mildew, mold, algae, etc.) is also oxidized on the surface.

International Application Publications Nos. WO2005/083014, WO 2006/030250, and WO 2005/083013 to Goodwin et al. describe self-cleaning and de-polluting coating compositions comprising photocatalytic $TiO_2$.

When $NO_x$ species are oxidized by the reactive species produced by the photocatalytic reaction, nitric and nitrous acids are formed. The acidic species are neutralized to nitrites and nitrates by alkaline fillers or extenders present in the coating compositions, which are removed from the coating by rainfall. The most commonly used extender is calcium carbonate.

Coating compositions that comprise photocatalytic titanium dioxide can be made using different types of organic binders or resin systems. In the absence of other materials, organic binders decompose in the presence of UV light to carbon dioxide, water and nitrogen containing species, if present, resulting in degradation of the coating. This problem is exacerbated when the coating is exposed to intense UV radiation from direct sunlight, as is the case with an exterior paint. Such coatings are often formulated with inorganic binders or with organic polymers which are resistant to photocatalytic oxidation at relatively low catalyst concentrations. Previously, coatings comprising photocatalytic titanium dioxide have been prepared with silicone-based polymers, such as siloxane polymers, due to the greater stability of these materials in the presence of active species produced from photocatalytic reactions. The use of binders exclusively comprising silicone-based polymers is disfavored because silicone-based polymers are significantly more expensive compared to other organic polymers, such as acrylic or styrene based polymers. It is desirable to prepare a cost-effective photocatalytic coating composition comprising a reduced amount of silicon-based polymer mixed with a lower cost organic polymer. However, mixing organic polymers with silicone based polymers results in lower durability of the coating composition.

Therefore, there exists a need for an improved photocatalytic coating composition that exhibits improved durability and optical properties at a lower cost, while maintaining the ability to remove acidic by-products of the photocatalytic NOx oxidation reactions.

The foregoing discussion is presented solely to provide a better understanding of the nature of the problems confronting the art and should not be construed in any way as an admission as to prior art nor should the citation of any reference herein be construed as an admission that such reference constitutes "prior art" to the instant application.

SUMMARY OF THE INVENTION

The self-cleaning, de-polluting coating compositions of the present invention comprise catalytic titanium dioxide, a binder comprising a silicon-based polymer, and an extender component which comprises a mixture of calcium carbonate and one or more alternate extenders. The inventive coating compositions exhibit improved durability and opacity at a lower cost, while retaining the ability to remove $NO_x$ from the environment and neutralize acidic by-products from the photocatalytic oxidation of $NO_x$ substances.

In one embodiment, the coating compositions further comprise a pigment, which may be pigmentary titanium dioxide or a mixture of titanium dioxide and one or more pigments.

The binder of the inventive compositions typically also comprise an organic polymer in addition to the silicon-based polymer. Also encompassed by the invention are compositions that comprise a binder component comprising a silicon-based polymer and mixtures of organic polymers or co-polymers. In some embodiments of the invention, the organic polymer is a styrene polymer or copolymer or an acrylic polymer or copolymer. Preferably the organic polymer or copolymer is a styrene-acrylic copolymer.

The one or more alternate extenders in the inventive compositions may be any extender other than calcium carbonate that improves the durability of a coating produced when the composition is applied to a substrate including, but not limited to, kaolin clays, silica, talcs, quartz and barytes. A "flash calcined" kaolin clay is particularly useful with the inventive compositions. In some embodiments, the extender component in the compositions comprises a mixture of calcium carbonate and one or more alternate extenders in a ratio of about 50:50 to about 90:10 or about 65:35 to about 75:25, calcium carbonate to alternate extenders, by volume.

The inventive compositions may use photocatalytic titanium dioxide in any form, including the rutile and anatase form or mixtures thereof. Typically, the photocatalytic titanium dioxide is in the anatase form. Preferably, the photocatalytic titanium dioxide is substantially in the absence of the rutile form. In one embodiment, the photocatalytic titanium dioxide comprises between about 2% and about 10% PVC by volume of the dry composition.

In one embodiment, the inventive coating compositions include a binder component that comprises a mixture of a polysiloxane polymer and a styrene-acrylic copolymer and an extender component that comprises a mixture of calcium carbonate and a flash calcined kaolin clay. In one embodiment of the inventive composition, the binder component comprises a mixture of polysiloxane polymer and styrene-acrylic copolymer in a ratio of about 50:50 to about 70:30 by volume, polysiloxane polymer to styrene-acrylic copolymer. In other embodiments, the extender component of the composition comprises a mixture of calcium carbonate and a flash calcined kaolin clay in a ratio of between about 60:40 to about 80:20 or between about 60:40 to about 70:30, calcium carbonate to kaolin clay by volume.

These and other aspects of the present invention will be better understood by reference to the following detailed description and accompanying figures.

DETAILED DESCRIPTION

Figure 1:
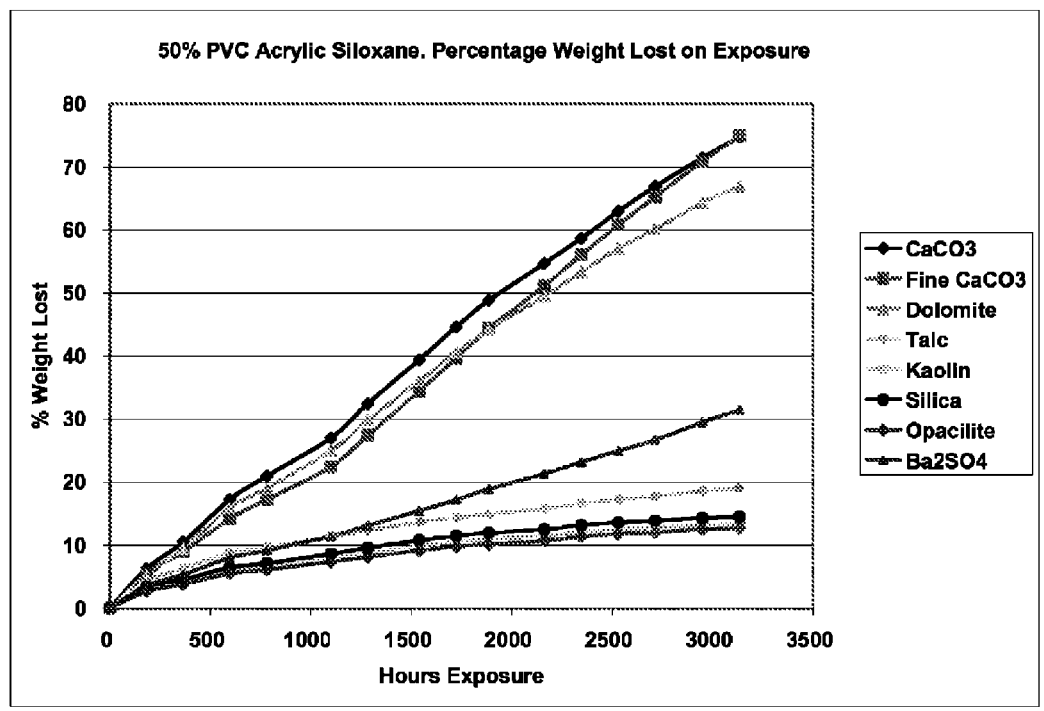
FIG. 1 shows a plot depicting the durability of coatings produced from coating compositions as a function of different extenders.

In a preferred embodiment, the present invention provides a coating composition comprising photocatalytic titanium dioxide, a mixture of a silicon-based binder and an organic binder and extender component which comprises a mixture of calcium carbonate and one or more alternate extenders. The inventive coating compositions produce coatings when applied to a substrate that exhibit excellent durability and improved opacity at a lower cost, while retaining the ability to remove $NO_x$ from the environment and neutralize acidic by-products from the photocatalytic oxidation of $NO_x$ substances.

Photocatalytic coating compositions can be made with a variety of binders or resin systems. Typically, these coating compositions comprise silicon-based binders, such as polysiloxane polymers, which exhibit good stability under the photocatalytic redox conditions. Organic binders that are composed solely of carbon, hydrogen, oxygen and nitrogen, are quickly oxidized by the photocatalytic titanium dioxide in the presence of UV light to water, carbon dioxide and nitrogen-containing species, resulting in degradation of the coating.

Although coating compositions comprising siloxane type polymers show excellent durability, the cost of siloxane type polymers is significantly higher than the cost of other organic polymers such as acrylic or styrene polymers. Therefore, it is desirable to prepare coating compositions where the quantity of the siloxane type polymer is reduced in favor of a second organic polymer to reduce the raw material cost of the coating composition. However, diluting a siloxane-type polymer with an organic polymer composed of only carbon, hydrogen and oxygen adversely affects the durability of the coating produced. For example, exposure of a coating comprised of 100% siloxane polymer for 2000 hours in an Atlas Weatherometer resulted in a weight loss of 126 mg/100 cm$^2$, whereas exposure of a coating based on a styrene/acrylic copolymer resulted in a weight loss of 419 mg/100 cm$^2$. Using mixtures of siloxane polymers with organic polymers in coating compositions improves the durability of the corresponding coatings over organic polymer based compositions alone, but still results in progressively diminished durability as the siloxane polymer concentration is reduced.

Photocatalytic coating compositions also typically include inorganic fillers or extenders. In polymer or plastic applications, these components are commonly referred to as fillers, while in coating applications they are referred to as extenders. Some extenders may also provide hiding power and function as pigments. Most extenders are color neutral. Extenders that are alkaline are particularly useful because they can neutralize acidic species such as nitric and nitrous acid that are formed from the photocatalytic oxidation of $NO_x$ species. The nitrites and nitrate salts formed from the neutralization of nitric and nitrous acids are dissolved and removed from the coating upon contact with water. Any extender that is alkaline is capable of reacting with nitrous or nitric acid, including carbonate salts such as calcium carbonate, zinc carbonate, magnesium carbonate and mixtures thereof. The most commonly used alkaline extender in coating applications is calcium carbonate.

It has been surprisingly found that the loss of durability of coatings which comprise a mixture of a siloxane-type polymer with an organic polymer can be recovered by partially replacing a part of the calcium carbonate in the extender component with one or more alternate extenders. The alternate extenders may be any type of extender other than calcium carbonate that results in improved durability of the coating derived from the coating composition. Suitable alternate extenders include, but are not limited to, china clays, kaolin clays, silica, talcs, quartz and barites (barium sulphate). Furthermore, the use of a mixture of calcium carbonate and one or more alternate extenders results in coating compositions that impart improved opacity. Therefore, the inventive coating compositions also allow for the reduction of pigmentary titanium dioxide without reducing the opacity of the system, further lowering the raw material costs of the coating compositions.

Definitions

All terms used herein are intended to have their ordinary meaning unless otherwise provided.

All references to "% by weight" herein relate to the weight % of the total coating composition, including solvent, rather than the dried paint, unless otherwise specified.

As used herein the term "% by volume" or "pigment volume concentration" (PVC) refers to the volume % of the dry paint or coating, unless otherwise specified. The components of the dry paint or coating used to calculate the "% by volume" value include the photocatalytic $TiO_2$, pigment, extender and polymer.

The term "$NO_x$" refers to the species NO (nitrogen oxide) and $NO_2$ (nitrogen dioxide), either collectively or individually.

The term "flash calcined kaolin clay" refers to a kaolin clay produced by a rapid heating calcination process.

The term "extender" is intended to have its customary meaning in the art. As used herein, the term "extender" refers to an inorganic material or mixture of inorganic materials which have refractive indices similar to the medium of the coating so that they are usually transparent in the coating medium below the critical pigment volume concentration but have significant opacity (although lower than $TiO_2$) above the critical pigment volume concentration. The extender materials are typically lower in cost than the pigments, including $TiO_2$, and allow for the replacement of some of the pigment in certain situations.

The term "critical pigment volume concentration" (CPVC) is intended to have its customary meaning in the art, such as the point at which there is just sufficient polymer to wet the pigment particles or provide a continuum of pigment particles and polymer. Below the CPVC there is sufficient polymer for pigment wetting and above the CPVC there is not.

The term "aliphatic" is intended to have its customary meaning in the art, and includes without limitation straight-chain, branched or cyclic hydrocarbons which are completely saturated or which contain one or more units of unsaturation but which are not aromatic. Non limiting examples of aliphatic groups include substituted or unsubstituted linear, branched or cyclic alkyl, alkenyl and alkynyl groups and hybrids thereof such as (cycloalkyl)alkyl, (cycloalkenyl)alkyl or (cycloalkyl)alkenyl.

The term "alkyl" is intended to have its customary meaning, and includes straight, branched, or cyclic, primary, secondary, or tertiary hydrocarbon.

The term "aryl" is intended to have its customary meaning in the art, and includes any stable monocyclic, bicyclic, or tricyclic carbon ring(s), wherein at least one ring is aromatic as defined by the Huckel 4n+2 rule, and includes phenyl, biphenyl, or naphthyl.

The term "heteroaryl" is intended to have its customary meaning, and includes an aromatic ring that includes at least one sulfur, oxygen, nitrogen or phosphorus in the aromatic ring.

The term "aralkyl," unless otherwise specified, refers to an aryl group as defined above linked to the molecule through an alkyl group as defined above.

The term "alkaryl," unless otherwise specified, refers to an alkyl group as defined above linked to the molecule through an aryl group as defined above.

In addition to photocatalytic titanium dioxide particles, the coating compositions of the present invention typically comprise other components known to persons skilled in the art. The photocatalytic coating compositions may include thickeners, dispersants, antifoam agents, one or more opacifying agent, extenders, binders such as siloxane or acrylic polymers, a coalescent and stabilizing agents as well as other components used in coating compositions known to those skilled in the art.

Any form of titanium dioxide may be used in the coating compositions of the invention, including the rutile or anatase form. Furthermore, mixtures of rutile and anatase titanium dioxide may be used. The photocatalytic coating compositions of the invention comprise particles of photocatalytic titanium dioxide ($TiO_2$) which are capable of forming electron-hole pairs in the presence of electromagnetic radiation, particularly ultraviolet (UV), near-UV, and/or visible light. Preferably, the photocatalytic titanium dioxide is capable of substantial photoactivity in the presence of visible light.

The photocatalytic titanium dioxide particles for use in the coating compositions are preferably predominantly in the anatase crystalline form because of its higher photoactivity than the rutile form. "Predominantly" means that the level of anatase in the titanium dioxide particles of the paint is greater than 50% by weight, although it is preferred that the level of anatase is greater than about 80%, and more preferably greater than about 90% or greater than about 95%. In some embodiments, the photocatalytic titanium dioxide particles of the compositions will be in substantially pure anatase form, meaning that the content of the rutile crystalline form is less than about 5%, more particularly, less than about 2.5%, and more preferred still, less than about 1% by weight. In some embodiments, the photocatalytic titanium dioxide particles will be free of the rutile form, meaning that the rutile crystal form is not detectable by crystallography. Put another way, the photocatalytic titanium dioxide particles may comprise 100% anatase form. The degree of crystallization and the nature of the crystalline phase are measured by X-ray diffraction. In other embodiments, photocatalytic rutile titanium dioxide may be employed as the sole source of photocatalyst, or in combination with anatase photocatalytic titanium dioxide.

The photocatalytic titanium dioxide particles for use in the coating composition will typically have an average particle size which enables the particles to absorb and scatter ultraviolet light. As the particle sizes become very small, the band gap between the valence and conduction bands decreases. Thus, with sufficiently small particle sizes, it has been observed that titanium dioxide particles are capable of absorbing light in the visible spectrum. The titanium dioxide particles for inclusion in the inventive paints will typically have a particle size between about 1 nm and about 150 nm. In some embodiments, the particle size of the photocatalytic titanium dioxide particles will be between about 5 nm and about 20 nm, 25 nm, 30 nm or 40 nm. In a preferred embodiment, the particle size of the titanium dioxide in the paint will be between about 5 nm and about 15 nm, and more preferably between about 5 and about 10 nm. Reference herein to the size of titanium dioxide particles (or crystallites) will be understood to mean the average particle size of the titanium dioxide particulates. Where the particle size is modified by the term "about," it will be understood to embrace somewhat larger or smaller particles sizes than the indicated value to account for experimental errors inherent in the measurement and variability between different methodologies for measuring particle size, as will be apparent to one skilled in the art. The diameters may be measured by, for example, transmission electron microscopy (TEM) and also X-ray diffraction (XRD).

Alternatively, the particles may be characterized by surface area. Typically, the powdered titanium dioxide photocatalyst will have a surface area, as measured by any suitable method, including 5-point BET, of greater than about 20 $m^2/g$. More typically, the photocatalytic titanium dioxide particles have surface areas of greater than about 50 $m^2/g$ or greater than about 70 $m^2/g$. In more preferred embodiments, the titanium dioxide particles have surface areas greater than about 100 $m^2/g$, and preferably greater than about 150 $m^2/g$. In some embodiments, the titanium dioxide photocatalyst will have a surface area greater than about 200 $m^2/g$, greater than about 250 $m^2/g$, or even greater than about 300 $m^2/g$.

Photocatalytic titanium dioxide available from Millennium Inorganic Chemicals under the designations PC50, PC105, PCS300, SP 300N and PC500 have been found to be particularly useful for inclusion in coating compositions according to the invention. PCS300 and SP300N are 100% anatase titanium dioxide dispersions in water having an average crystallite size between about 5 nm and about 10 nm. PC500 is a 100% anatase titanium dioxide powder, which has a $TiO_2$ content between about 82% and about 86% by weight, and which has a surface area of about 250 to about 300 $m^2/g$, as measured by 5-point BET, which translates to an average particle size of about 5 nm to about 10 nm. The product designated PC50 and PC105, also from Millennium Inorganic Chemicals, will also find utility in some embodiments of the invention. PC50 comprises greater than 97% by weight titanium dioxide and PC105 comprises greater than 95% by weight titanium dioxide. The solid form of the $TiO_2$ for both PC50 and PC100 products is 100% anatase, and the surface area is between about 45 $m^2/g$ and about 55 $m^2/g$ and between about 80 and about 100 $m^2/g$, respectively. Of course, other sources of suitably photoactive titanium dioxide may be used in the invention and photocatalytic titanium dioxide may be prepared by any process known in the art. For example, the processes described in U.S. Pat. No. 4,012,338, which is incorporated by reference in its entirety, may be used to prepare photocatalytic titanium dioxide used in the coating compositions of the invention.

The inventive coating compositions will typically comprise from about 1% to about 40% photocatalytic titanium dioxide by volume of the dry coating composition (PVC). More typically, the compositions will comprise between about 2% to about 20% photocatalytic titanium dioxide by volume of the dry composition or about 5% to about 15%, and preferably from about 2% to about 10% or from about 5% to about 10% by volume. In one particular embodiment, the coating compositions of the invention comprise about 7.5% photocatalytic titanium dioxide by volume of the dry coating composition. The foregoing amounts of photocatalytic titanium dioxide represent the volume of photocatalyst in the dry paint composition taking into account only the photocatalyst, pigment, extender and binder.

It is within the scope of the invention to provide coating compositions having two or more different titanium dioxide photocatalysts, where at least one, and preferably each, of the titanium dioxide photocatalyst materials meet the specifications described above. Thus, for example, the invention embraces the use of bimodal photocatalytic titanium dioxide material, formed by combining two different titanium dioxide powders or sols, wherein at least one, and preferably both, have a particle size and/or surface area as defined above. In other embodiments, the photocatalyst will "consist essentially of" a particular titanium dioxide material described herein, by which is meant any additional photocatalyst having materially different activities is excluded, or that amounts of additional photocatalyst which materially impact the durability, de-polluting, or self-cleaning properties of the paint are excluded.

In addition to the photocatalytic titanium dioxide, the coating compositions of the invention may further comprise one or more pigments. The term "pigments" is intended to embrace, without limitation, pigmentary compounds employed as colorants, including white pigments, as well as ingredients commonly known in the art as "opacifying agents". Included are any particulate organic or inorganic compounds able to provide hiding power to the coating, and in particular at least one inorganic compound like pigmentary grade titanium dioxide. Such titanium dioxide pigments are disclosed in U.S. Pat. No. 6,342,099 (Millennium Inorganic Chemicals Inc.), the disclosure of which is hereby incorporated by reference. In particular, the titanium dioxide pigment may be the particles of Tiona™ 595 sold by Millennium Inorganic Chemicals Ltd. Pigmentary grade titanium dioxide are typically in the rutile form and have less photocatalytic activity. Pigmentary titanium dioxide may comprise a coating of aluminum oxide, silicon dioxide, or the like as a passivating layer on the surface of the particles.

The coating compositions according to the invention typically, but not necessarily, have a pigment volume concentration (PVC) between about 40% and about 90%, more typically between about 40% and about 70%, and preferably between about 45% and about 65%.

Typically, the coating compositions of the invention comprise one or more organic binders, preferably a polymeric organic binder. In the broadest aspect of the invention, it is contemplated that any polymeric binder may be employed. In one embodiment, the polymeric binder is a water-dispersible polymer, including but not limited to latex binders, such as natural latex, neoprene latex, nitrile latex, acrylic latex, vinyl acrylic latex, styrene acrylic latex, styrene butadiene latex, and the like. The present invention embraces compositions that include a single binder or a mixture of two or more polymeric binders that may be of the same class or different. For example, organic binders may be combined with a silicon-based binder.

The inventive photocatalytic coating compositions typically comprise between about 1% to about 60% binder by volume of the coating composition (PVC). This concentration refers to the total binder content per volume of the composition, which may include mixtures of two or more binders, as well as other components and solvent. More typically, the amount of binder in the composition is between about 5% to about 50%, about 10% to about 40% or between about 15% and about 40% by volume. Preferably, the amount of binder will be between about 20% and about 30% by volume.

For compositions that include photocatalytic titanium dioxide, it is preferable to include at least one silicon-based binder because of the excellent stability of these polymers to the photochemical conditions produced by the photocatalytic titanium dioxide.

In some embodiments, the polysiloxanes according to the invention may be, for example, polyorganosiloxanes including without limitation polydialkylsiloxanes, polydiarylsiloxanes, polyalkylarylsiloxanes, polyalkylalkoxysiloxanes or the like. In one embodiment of the invention, the silicon-based binder includes a polysiloxane polymer represented by the following formula:

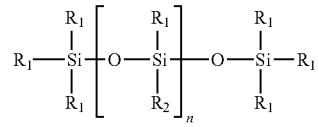

wherein
n will typically range from 5 about 5000, more typically from about 500 to about 5000, and preferably from about 1500 to about 5000; and $R_1$ and $R_2$ are independently aliphatic groups including alkyl groups such as methyl, ethyl, propyl, butyl, 2-ethylbutyl and octyl; cycloalkyl groups such as cyclohexyl and cyclopentyl; alkoxy groups such as methoxy and ethoxy; alkenyl groups such as vinyl, propenyl, butenyl, pentenyl, and hexenyl; aryl including phenyl, tolyl, xylyl, naphthyl and biphenyl; aralkyl including benzyl and phenylethyl; alkaryl or heteroaryl groups. Any of the groups $R_1$ and $R_2$ may be optionally substituted with one or more functional groups, including but not limited to halogen, cyano, nitro, amino, alkoxy, acyl, carboxyl or sulfonyl groups.

Suitable polysiloxane polymers include those sold under the tradename Silres® BS 45 from WACKER-Chemie GmbH which is an alkylsilicone resin sold as an emulsion in water comprising from 30% to 60% by weight polymethylethoxysiloxane The binder component of the inventive coating compositions typically comprises a polysiloxane polymer and optionally an alternate binder in a ratio of between about 20:80 to about 100:0, polysiloxane polymer to alternate binder, by volume. More typically, the binder component of the compositions will comprise a mixture of polysiloxane polymer and an alternate binder in a ratio of between about 40:60 to about 80:20 or between about 40:60 to about 70:30, polysiloxane polymer to alternate binder. Preferably, the binder component will comprise a mixture of polysiloxane polymer and an alternate binder in a ratio of between about 50:50 to about 70:30 polysiloxane polymer to alternate binder, by volume.

In one embodiment of the invention, a polysiloxane polymer may be mixed with an organic binder. Suitable organic binders include organic polymers such as styrene polymers or styrene/butadiene copolymers; acrylic polymers and co-polymers, including alkyl acrylates and methacrylates, acrylic acid and methacrylic acid polymers, acrylonitrile and acrylamide polymers and the like; and polyvinyl acetate polymers. In one embodiment, the binder comprises a mixture of a polysiloxane polymer and a styrene-acrylic copolymer.

Suitable organic polymers also include, but are not limited to, methyl methacrylate, styrene, methacrylic acid 2-hydroxyethyl acrylate polymer (CAS #70677-00-8), acrylic acid, methyl methacrylate, styrene, hydroxyethyl acrylate, butyl acrylate polymer (CAS #7732-38-6), butyl acrylate, methyl methacrylate, hydroxyethyl acrylate polymer (CAS #25951-38-6), butyl acrylate, 2-ethylhexyl acrylate, methyl methacrylate, acrylic acid polymer (CAS #42398-14-1), butylacrylate polymer (CAS #25767-47-9), butyl acrylate, 2-ethylhexyl acrylate, methacrylic acid polymer C (CAS #31071-53-1), carboxylated styrene butadiene polymers, polyvinyl alcohol polymers and copolymers, polyvinyl acetate polymers and co-polymers and the like. Combinations of more than one organic binder are also contemplated to be useful in the practice of the invention.

In some embodiments, the organic polymer may be chosen among copolymers of styrene/butadiene, and polymers and copolymers of esters of acrylic acid and in particular copolymers of polyvinylacrylic and styrene/acrylic esters. In the present invention, styrene acrylic copolymer includes copolymers of styrene/acrylic esters thereof. The styrene acrylic emulsion sold under the tradename ACRONAL™ 290D (BASF) has been found to be particularly useful as an organic binder in the inventive coating compositions.

The coating compositions of the invention also typically comprise extenders or fillers which serve to thicken coating films and support the structure of the coating composition. Some extenders may also provide hiding power and function as pigments, particularly above the critical pigment volume concentration, and most extenders are color neutral. Common extenders include clays such as kaolin clays, China clays, talcs, quartz, barytes (barium sulphate) and carbonate salts such as calcium carbonate, zinc carbonate, magnesium carbonate or mixtures thereof.

Some extenders are alkaline and have the ability to neutralize acidic species such as nitric and nitrous acid that are formed from the photocatalytic oxidation of $NO_x$ species. The nitrites and nitrate salts formed from the neutralization of nitric and nitrous acids are dissolved and removed from the coating upon contact with water. Extenders that are capable of removing acidic byproducts of catalytic $NO_x$ oxidation may be any alkaline species that are capable of reacting with nitrous or nitric acid, and include carbonate salts such as calcium carbonate, zinc carbonate, magnesium carbonate and mixtures thereof. The most common alkaline extender in coating applications is calcium carbonate.

There is no limitation on the amount of extender used in the compositions, however, typically the inventive coating compositions comprise between about 1% to about 60% extender by volume (PVC). More typically, the compositions will comprise between about 5% to about 30% or from about 10% to about 40%. Preferably, the compositions will comprise between about 20% to about 40% or between about 25% to about 35% extender by volume.

It has been surprisingly found that when a mixture of calcium carbonate and one or more alternate extenders is used in photocatalytic coating compositions, the durability of the resulting coating is superior to that of identical compositions where only calcium carbonate is used as an extender. Using a mixture of calcium carbonate and an alternate extender results in improved durability of the photocatalytic coating, making it possible to replace a portion of the silicon-based binder in the composition with an organic binder without compromising the durability of the coating. The durability of the coating compositions are evaluated by the weight loss of the coatings per area, when exposed to accelerated weathering conditions. The alternate extender can be any extender that when combined with calcium carbonate improves the durability of photocatalytic coating compositions. Typically, the alternate extender include, but are not limited to, kaolin clays, China clays, talcs, quartz and barytes (barium sulfate). In a preferred embodiment, the alternate extender is a "flash calcined" kaolin clay. A particularly suitable flash calcined kaolin clay for use with the present invention is sold by the tradename Opacilite™ by Imerys, Ltd. The present invention also contemplates replacement of some of the calcium carbonate with mixtures of two or more alternate extenders.

For example, for a photocatalytic coating composition comprising a binder component with a 60:40 (by volume) mixture of polysiloxane polymer and a styrene-acrylic copolymer, replacement of about a third of the calcium carbonate by volume with Opacilite™ results in a reduction of the weight loss of the resulting coating when tested for durability from about 265 mg/100 cm$^2$ to about 126 mg/cm$^2$. As noted above, the weight loss of 126 mg/cm$^2$ is equivalent to the weight loss of a coating comprising 100% siloxane binder. Put in another way, the loss of durability of the coating due to use of a mixture of a silicon-based binder with an organic binder is eliminated by replacing about a third of the calcium carbonate extender with an alternate extender, such as Opacilite™. When the extender component contains a 50:50 mixture of calcium carbonate and Opacilite™ (by volume), the weight loss of the coating is reduced to only 76 mg/100 cm$^2$, a significant improvement in durability even beyond the durability of coatings using 100% silicon-based compositions.

In one embodiment, the inventive coating compositions increase the stability of the photocatalytic coatings produced so that the weight loss of the coatings when exposed to accelerated exposure testing according to the methods described herein is reduced by at least 20% compared to a control coating derived from a composition that contains only calcium carbonate as the extender component. In other embodiments, the weight loss of the coatings produced from the inventive coating compositions is reduced by at least 30%, or by at least 40% compared to a control composition. More typically, the durability of the coatings produced from the inventive compositions is increased to an extent that the weight loss is reduced by at least 50% or at least 60%. Preferably, the stability of the inventive coatings is such that the weight loss is reduced by at least 75% or 80% compared to a control coating produced from a composition that comprises only calcium carbonate as the extender.

FIG. 1 shows the weight loss of coatings produced from compositions which include a binder mixture comprising a 60:40 ratio of polysiloxane polymer to styrene acrylic copolymer with extender components comprising several types of calcium carbonate and alternate extenders, including talc, China clays (kaolin clay), silica, barytes (Ba$_2$SO$_4$). The figure demonstrates that replacement of calcium carbonate with alternate extender reduces the weight loss of the coating when exposed to accelerated weathering conditions.

Replacement of an extender that is alkaline, such as calcium carbonate, with non-alkaline alternate extenders will likely reduce the capacity of the de-polluting photocatalytic coating to remove acidic species, however, the rate of removal of $NO_x$ should not be affected as long as the composition comprises a minimum quantity of a alkaline extender. It has been found that replacement of up to a third of calcium carbonate with Opacilite™ in the extender component (by volume) has little effect on the rate of $NO_x$ removal. For example, changing the extender component from 100% calcium carbonate to an 80:20 mixture of calcium carbonate and an alternate extender, such as Opacilite™, only reduces the rate of $NO_x$ removal from about 69% after 42 days of exposure to about 68% of the total $NO_x$.

It has also been found that replacement of a portion of the calcium carbonate with one or more alternate extenders results in improved opacity of the coating, as determined by scattering coefficient measurements. As an example, modifying the calcium carbonate content in the extender component from 100% calcium carbonate to a an 80:20 mixture of calcium carbonate and Opacilite™ improves the scattering coefficient of the coating from 4.4 to 5.0. Therefore, in some embodiments of the invention, a portion of the calcium carbonate is replaced by one or more alternate extenders and the amount of the pigmentary $TiO_2$ in the coating compositions is reduced without affecting the opacity of the coating. The opacity of the coating increases because the Opacilite™ is has more light scattering voids associated with it than calcium carbonate. The improvement in opacity by using Opacilite™ then allows the pigmentary $TiO_2$ to be reduced. The amount of pigment that can be reduced in the inventive coating compositions depends on the alternate extender that is used and its effect on the opacity of the system. Typically, the inventive composition will allow a reduction of between about 5% to about 20% reduction in the amount of pigmentary $TiO_2$ (by volume). More typically, between about 5% to about 15% of the pigmentary grade will be reduced.

The total amount of calcium carbonate that can be replaced by an alternate extender is not limited and depends on the performance of the photocatalytic coating composition which is determined experimentally. For example, some alternate extenders will have less impact on the improvement of the durability of the coating than others, requiring a larger quantity in the compositions. Other alternate extenders will have a smaller impact on the ability to remove acidic species than other extenders. The inventive coating compositions will typically comprise extender components comprising a mixture of calcium carbonate and one or more alternate extender(s) in a ratio of between about 40:60 to about 90:10 by volume, or between about 50:50 to about 75:25, calcium carbonate to one or more alternate extender(s), by volume. The balance may comprise more than one extender. For example, for an extender component that comprises a mixture of calcium carbonate and one or more alternate extenders in a ratio of 75:25, the 25 may comprise a mixture of more than one alternate extender. More typically, the extender component will comprise a mixture of calcium carbonate and alternate extender in a ratio of between about 60:40 to about 80:20 or between about 60:40 to about 70:30, calcium carbonate to alternate extender(s), by volume. Preferably, the composition will comprise a mixture of calcium carbonate and an alternate extender in a ratio of between about 70:30 to about 80:20 or between about 65:35 to about 75:25, calcium carbonate to alternate extender(s). It will be apparent to those skilled in the art that the amount of total extender in the inventive coating compositions is not limited and based on the desired characteristics of the specific composition.

If necessary, various other compounds may be added to the composition of the invention, but preferably such an addition does not compromise the shelf life, photoactivity, durability or non-staining properties of the resulting coating. Examples of such additional compounds include filler(s) such as quartz, calcite, clay, talc, barite and/or Na—Al-silicate, and the like; pigments like $TiO_2$, lithopone, and other inorganic pigments; dispersants such as polyphosphates, polyacrylates, phosphonates, naphthene and lignin sulfonates, to name a few; wetting agents, including anionic, cationic, amphoteric and/or non-ionic surfactants; defoamers such as, for example, silicon emulsions, hydrocarbons, and long-chain alcohols; stabilizers, including for example, mostly cationic compounds; coalescing agents including, without limitation, alkali-stable esters, glycols, and hydrocarbons; Theological additives like cellulose derivatives (e.g., carboxymethylcellulose and/or hydroxyethylcellulose), xanthane gum, polyurethane, polyacrylate, modified starch, bentone and other lamellar silicates; water repellents such as alkyl siliconates, siloxanes, wax emulsions, fatty acid Li salts; and conventional fungicide or biocide.

The present invention will be described in more detail with reference to the following examples. The examples presented are illustrative of the invention and are not intended to be limiting.

EXAMPLE 1

The effect of lowering the concentration of polysiloxane polymer in the binder of the compositions on the durability of the coatings was examined by preparing six compositions with varying amounts of polysiloxane polymer mixed with styrene-acrylic copolymer. The complete compositions are presented in Table 1 below. The composition component quantities in table 1 are in weight (grams).

TABLE 1

| Ingredient | Function | Composition No. | | | | | |
| --- | --- | --- | --- | --- | --- | --- | --- |
| | | 1 | 2 | 3 | 4 | 5 | 6 |
| Part A | | | | | | | |
| Natrosol ™ 250MR | thickener | 77.1 | 77.1 | 77.1 | 77.1 | 77.1 | 77.1 |
| Dispex ® N40 | dispersant | 2.2 | 2.2 | 2.2 | 2.2 | 2.2 | 2.2 |
| Nopco NXZ | antifoam | 0.3 | 0.3 | 0.3 | 0.3 | 0.3 | 0.3 |
| PC105 | $TiO_2$ photocatalyst | 20.9 | 20.9 | 20.9 | 20.9 | 20.9 | 20.9 |
| Tiona ™-595 | $TiO_2$ pigment | 41.7 | 41.7 | 41.7 | 41.7 | 41.7 | 41.7 |
| $CaCO_3$ | extender | 51.6 | 51.6 | 51.6 | 51.6 | 51.6 | 51.6 |
| Water | solvent | 18.2 | 18.2 | 18.2 | 18.2 | 18.2 | 18.2 |
| Part B | | | | | | | |
| Water | solvent | 17.2 | 14.7 | 12.3 | 11.0 | 9.8 | 7.3 |
| Silres ® BS45 | siloxane polymer | 75.0 | 60.0 | 45.0 | 30.0 | 15.0 | 0 |
| Acronal ™ 290D | styrene acrylic polymer | 0 | 15.0 | 30.0 | 45.0 | 60.0 | 75.0 |
| Texanol ™ | coalescent | 3.8 | 3.8 | 3.8 | 3.8 | 3.8 | 3.8 |
| Bactericide | Bactericide | 0.3 | 0.3 | 0.3 | 0.3 | 0.3 | 0.3 |
| Total | | 308.2 | 303.3 | 298.4 | 295.9 | 293.4 | 288.4 |

Each composition comprised 15% Tiona™ 595 pigmentary $TiO_2$ and 7.5% PC105 photocatalytic $TiO_2$ (PVC) from Millennium Inorganic Inorganic Chemicals. The coating compositions are prepared in two parts (part A and B). For part A, the ingredients in Table 1 are successively added to water with mixing and the resulting mixture is mixed further under high shear for 20 minutes. For part B, the polysiloxane and/or styrene-acrylic copolymers were added to water with mixing followed by the coalescent and bactericide. The components are further mixed for a minimum of five minutes. Part A was then mixed with Part B under high shear mixing.

Acronal™ 290D is a styrene acrylic copolymer used as an organic binder available from BASF. Acronal™ 290D comprises 50% by weight solids in water. Silres® BS 45 is a water-thinable solventless emulsion of a silicone resin used as a binder available from Wacker Chemie AG.

Each paint sample is applied at a coverage of 77 g/m² (based on the dried weight of the coating) on a substrate and the substrates were tested to determine the impact of increasing amount of styrene-acrylic copolymer on the durability of the coating.

Determination of Coating Durability

The complete methodology for determining durability of the paints is described in U.S. Patent Pub. 2007/0167551, the disclosure of which is hereby incorporated by reference. The methodology involves accelerated weathering of 20 to 50 micron thick paint films on a stainless steel substrate in a Ci65A Weatherometer (Atlas Electric Devices, Chicago) under a 6.5 kW Xenon source emitting 550 W/m² UV at 340 nm. The black panel temperature was about 63° C., and water spray was applied for 18 minutes out of every 120 minutes, with no dark cycle. The durability is measured as a function of the weight loss of the sample following exposure. Coatings produced from each of the compositions 1-7 presented in Table 1 above were exposed for 2000 hours according to the testing protocol and the weight loss was determined. Table 2 below summarizes the results for the durability testing of coatings comprising mixtures of polysiloxane polymer and styrene-acrylic copolymer.

TABLE 2

| Composition # | Siloxane:Styrene Acrylate Volume Ratio | Weight loss (mg/100 cm²) |
|---|---|---|
| 1 | 100:0 | 126 |
| 2 | 80:20 | 178 |
| 3 | 60:40 | 265 |
| 4 | 40:60 | 328 |
| 5 | 20:80 | 363 |
| 6 | 0:100 | 419 |

Figure 2:
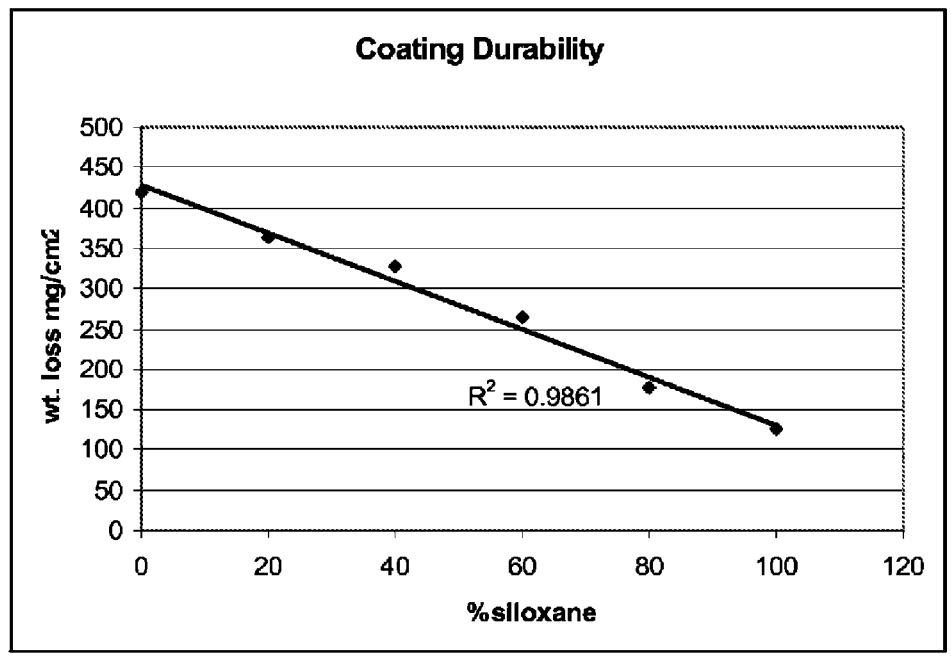
FIG. 2 is a plot showing coating durability as a function of the binder siloxane content.
Figure 3:
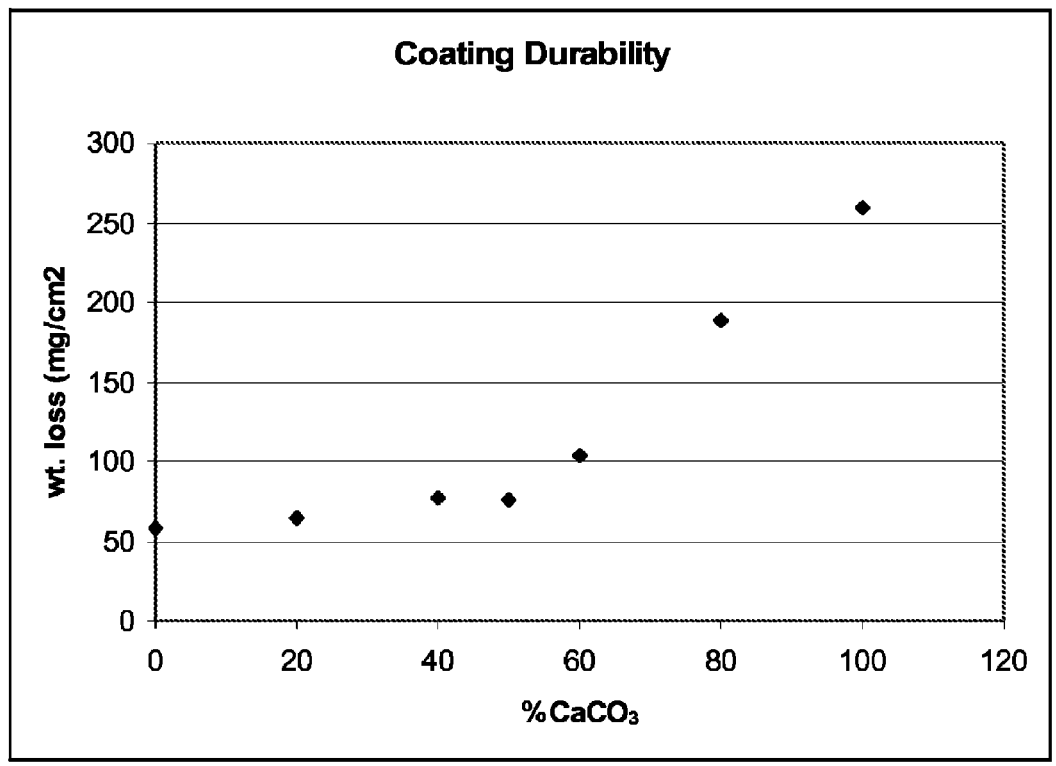
FIG. 3 is a plot showing the coating durability as a function of the extender calcium carbonate content.
Figure 4:
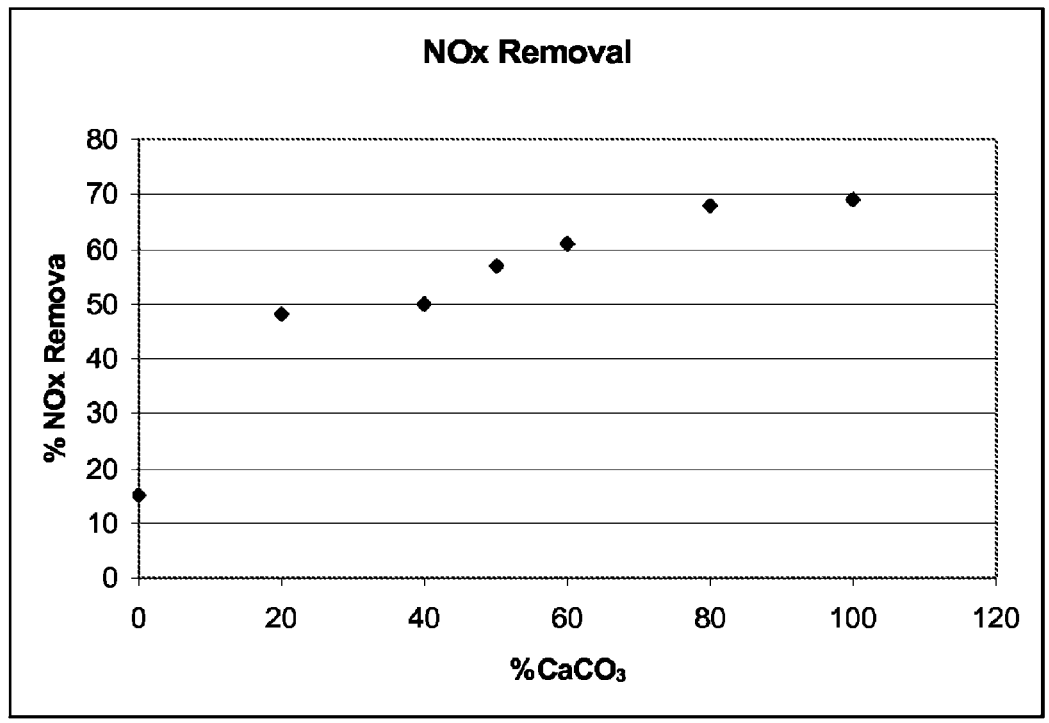
FIG. 4 is a plot showing the $NO_x$ removal as a function of the extender calcium carbonate content.

As shown in Table 2, the durability of the coating is adversely affected by increasing the proportion of the styrene acrylic copolymer. As discussed above, organic polymers with only carbon, hydrogen and oxygen are quickly oxidized by the photocatalytic coatings to form water and $CO_2$. The relationship of weight loss of the coating after exposure as a factor of percentage siloxane polymer is linear. A plot of the weight loss as a function of percentage polysiloxane is shown in FIG. 2.

EXAMPLE 2

As discussed previously, it has been surprisingly found that replacement of a portion of the calcium carbonate extender with one or more alternate extenders improves the durability of the coatings. The ability of the inventive coatings to remove $NO_x$ pollutants, their durability and the effect of replacing part of the calcium carbonate with Opacilite™ on opacity was investigated by preparing seven water-based photocatalytic coatings comprising a standard 60:40 mixture (by volume) of a polysiloxane polymer (Silres® BS45) and a styrene-acrylic copolymer (Acronal™ 290D) as binder, with varying ratios of calcium carbonate and a flash calcined kaolin clay sold under the tradename Opacilite™. The coating compositions were prepared using the same procedure described above for Example 1. The extender make up was varied by replacing a portion of calcium carbonate with a "flash calcined" kaolin clay sold by the tradename Opacilite™. The coating compositions were prepared with a ratio of calcium carbonate to Opacilite™ of 100:0, 80:20, 60:40, 50:50, 40:60, 20:80 and 0:100 by volume. The complete compositions are presented in Table 3 below. Each component is indicated by weight. The ratios of $CaCO_3$ are by volume.

TABLE 3

| | | Composition # | | | | | | |
|---|---|---|---|---|---|---|---|---|
| Ingredient | Function | 7 | 8 | 9 | 10 | 11 | 12 | 13 |
| Part A | | | | | | | | |
| CaCO₃ to Opacilite ™ ratio | | 100:0 | 80:20 | 60:40 | 50:50 | 40:60 | 20:80 | 0:100 |
| Natrosol ™ 250MR | thickener | 77.1 | 77.1 | 77.1 | 77.1 | 77.1 | 77.1 | 77.1 |
| Dispex ® N40 | dispersant | 2.2 | 2.2 | 2.2 | 2.2 | 2.2 | 2.2 | 2.2 |
| Nopco NXZ | antifoam | 0.3 | 0.3 | 0.3 | 0.3 | 0.3 | 0.3 | 0.3 |
| PC105 | TiO₂ photocatalyst | 20.9 | 20.9 | 20.9 | 20.9 | 20.9 | 20.9 | 20.9 |
| Tiona ™-595 | TiO₂ pigment | 41.7 | 41.7 | 41.7 | 41.7 | 41.7 | 41.7 | 41.7 |
| CaCO₃ | extender | 51.6 | 41.3 | 31.0 | 25.8 | 20.7 | 10.3 | 0.0 |
| Opacilite ™ | extender | 0.0 | 7.8 | 15.7 | 19.6 | 23.5 | 31.4 | 39.2 |
| Water | solvent | 18.2 | 18.2 | 18.2 | 18.2 | 18.2 | 18.2 | 18.2 |
| Part B | | | | | | | | |
| Water | solvent | 17.2 | 14.7 | 12.3 | 11.0 | 9.8 | 7.3 | 4.8 |
| Silres ® BS45 | siloxane polymer | 45.0 | 45.0 | 45.0 | 45.0 | 45.0 | 45.0 | 45.0 |

TABLE 3-continued

| Ingredient | Function | Composition # | | | | | | |
|---|---|---|---|---|---|---|---|---|
| | | 7 | 8 | 9 | 10 | 11 | 12 | 13 |
| Acronal ™ 290D | styrene acrylic polymer | 30.0 | 30.0 | 30.0 | 30.0 | 30.0 | 30.0 | 30.0 |
| Texanol ™ | coalescent | 3.8 | 3.8 | 3.8 | 3.8 | 3.8 | 3.8 | 3.8 |
| Bactericide | Bactericide | 0.3 | 0.3 | 0.3 | 0.3 | 0.3 | 0.3 | 0.3 |
| Total | | 308.2 | 303.3 | 298.4 | 295.9 | 293.4 | 288.4 | 283.5 |

Effect of Alternate Extender on Durability

The effect of replacing part of the calcium carbonate with Opacilite™ was studied using the same methodology described above for Example 1. Coatings from each of the compositions 7-13 were evaluated after exposure for 2000 hours in a Ci65A Weatherometer (Atlas Electric Devices, Chicago). The results are presented in Table 3 below.

TABLE 3

| Composition # | CaCO$_3$:Opacilite ™ Volume Ratio | Weight loss (mg/100 cm$^2$) |
|---|---|---|
| 7 | 100:0 | 260 |
| 8 | 80:20 | 189 |
| 9 | 60:40 | 104 |
| 10 | 50:50 | 76 |
| 11 | 40:60 | 77 |
| 12 | 20:80 | 65 |
| 13 | 0:100 | 58 |

It is apparent from the results that as the percentage of calcium carbonate in the compositions is decreased and replaced with Opacilite™, the weight loss of the coating is reduced significantly, indicating improved durability. The results for composition #3 are consistent with results obtained previously with 100% calcium carbonate and a 60:40 mixture of polysiloxane polymer to styrene-acrylic copolymer (see Table 2, composition 3). The results also show that compositions with an extender component that comprises a mixture of calcium carbonate and Opacilite™ in a ratio of between 80:20 to 60:40 by volume recovers the durability lost as a result of using a 60:40 mixture of siloxane and styrene acrylic copolymer.

EXAMPLE 3

Determination of NO$_x$ Removal by Coatings

The ability of coatings produced from the inventive compositions to remove NO$_x$ was tested to evaluate the effect of replacing part of the calcium carbonate with Opacilite™ on the efficiency of the photocatalytic oxidation. Although replacing some of the calcium carbonate with a non-alkaline extender will reduce the capacity of the coatings to remove nitric and nitrous acids, the rate of NO$_x$ removal should not theoretically be significantly affected. The complete methodology for determining NO$_x$ removal is described in U.S. Patent Publication No. 2007/0167551, the disclosure of which is hereby incorporated by reference. Coatings prepared from each of the photocatalytic coating compositions 7-13, with decreasing levels of calcium carbonate, were tested according to the standard methodology. Briefly, the samples were placed in an air-tight sample chamber and sealed. The sample chamber is in communication with a three channel gas mixer (Brooks Instruments, Holland) through which NO (nitric oxide), and compressed air containing water vapor are introduced into the chamber at predetermined levels. The samples are irradiated with 8 W/m$^2$ UV radiation in the range of 300 to 400 nm from a UV Lamp Model VL-6LM 365 & 312 nanometer wavelengths (BDH). Initial values and final values (after five minutes irradiation) of NOx were measured by a Nitrogen Oxides Analyser Model ML9841B (Monitor Europe) connected to the sample chamber. The % reduction in NO$_x$ was measured as ($\Delta$ NOx/Initial NOx)×100. The results are summarized in Table 4.

TABLE 4

| Composition # | CaCO$_3$:Opacilite ™ Volume Ratio | % NO$_x$ Removal after 42 days exposure |
|---|---|---|
| 7 | 100:0 | 69 |
| 8 | 80:20 | 68 |
| 9 | 60:40 | 61 |
| 10 | 50:50 | 57 |
| 11 | 40:60 | 50 |
| 12 | 20:80 | 48 |
| 13 | 0:100 | 15 |

The results of the tests indicate that changing the extender component from comprising solely calcium carbonate to a mixture of calcium carbonate and Opacilite™ in a ratio of 80:20 has negligible impact on the ability of the coatings to remove NO$_x$ species from the environment. Furthermore, the data shows that the ability of the coatings to remove NOx is maintained even after replacement of 80% of the calcium carbonate with Opacilite™.

EXAMPLE 4

The opacity of coatings derived from the inventive compositions was also evaluated. Scattering coefficient measurements of compositions 7-13 were obtained using the Kubelka-Munk equations from reflectance data obtained from dry coating films using standard methodology known in the art (Gardner Colorview instrument, BYK-Gardner USA, Columbia, Md.). The results of the measurements are presented in Table 5 below.

TABLE 5

| Composition # | CaCO$_3$:Opacilite ™ Volume Ratio | Scattering Coefficient |
|---|---|---|
| 7 | 100:0 | 4.4 |
| 8 | 80:20 | 5.0 |
| 9 | 60:40 | 5.2 |
| 10 | 50:50 | 5.9 |
| 11 | 40:60 | 6.1 |

TABLE 5-continued

| Composition # | CaCO$_3$:Opacilite ™ Volume Ratio | Scattering Coefficient |
|---|---|---|
| 12 | 20:80 | 6.3 |
| 13 | 0:100 | 6.6 |

The data presented in Table 5 shows that the opacity of the system is improved in coatings that comprise less calcium carbonate and more Opacilite™. Based on these results, it is possible to reduce the amount of pigmentary TiO$_2$ in the inventive compositions without lowering the opacity of the coatings.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. In a coating composition for a substrate of the type comprising:
  (i) at least one titanium dioxide photocatalyst;
  (ii) a binder component comprising a mixture of a polysiloxane polymer and one or more of an organic polymer selected from styrene polymer, styrene copolymer, acrylic polymer, acrylic copolymer, a styrene-acrylic copolymer and mixtures thereof; and
  (iii) calcium carbonate, the improvement comprising incorporating into the composition an effective amount of a flash calcined kaolin clay at a ratio of calcium carbonate to flash calcined kaolin clay of from 80:20 to 20:80 by volume whereby the weight loss of a coating produced from the composition when applied and dried on a substrate and exposed to accelerated exposure testing is at least 20% less than an otherwise identical coating exposed to the same accelerated exposure testing but produced from a composition which does not include flash calcined kaolin clay.

* * * * *

UNITED STATES PATENT AND TRADEMARK OFFICE
CERTIFICATE OF CORRECTION

PATENT NO. : 7,776,954 B2
APPLICATION NO. : 12/022823
DATED : August 17, 2010
INVENTOR(S) : John Stratton and Graham Goodwin It is certified that error appears in the above-identified patent and that said Letters Patent is hereby corrected as shown below:

Column 12, line 13: Delete "Theological" and replace with -- rheological --.

Signed and Sealed this

Thirtieth Day of November, 2010

David J. Kappos
*Director of the United States Patent and Trademark Office*